United States Patent [19]

Harrell

[11] Patent Number: 4,718,703

[45] Date of Patent: Jan. 12, 1988

[54] APPARATUS AND METHOD FOR INTERCONNECTING A RESERVOIR WITH A RUBBER CUP

[76] Inventor: Joe S. Harrell, 2127 Siesta Dr., Dallas, Tex. 75224

[21] Appl. No.: 911,886

[22] Filed: Sep. 26, 1986

[51] Int. Cl.⁴ .................................................. F16L 3/04
[52] U.S. Cl. ..................................... 285/158; 285/903; 29/450
[58] Field of Search .................. 285/239, 921, 903, 8, 285/158, 159, 205, 260, 206; 29/450

[56] References Cited

U.S. PATENT DOCUMENTS

| | | | |
|---|---|---|---|
| 1,527,831 | 2/1925 | Borgner | 285/159 |
| 2,507,535 | 5/1950 | Madsen | 285/921 |
| 2,518,426 | 8/1950 | Kinander | 285/206 |
| 2,889,089 | 6/1959 | Herrick et al. | 285/921 |
| 3,490,791 | 1/1970 | Mitchell . | |
| 3,716,257 | 2/1973 | Hackman et al. . | |
| 4,018,459 | 4/1977 | Mominee et al. . | |
| 4,057,269 | 11/1977 | Bislew . | |
| 4,191,409 | 3/1980 | Ballantyne . | |
| 4,232,712 | 11/1980 | Squires . | |
| 4,352,358 | 10/1982 | Angelchik . | |
| 4,468,535 | 8/1984 | Law . | |
| 4,524,999 | 6/1985 | Pate et al. . | |
| 4,575,133 | 3/1986 | Nattel | 285/208 X |

FOREIGN PATENT DOCUMENTS

| | | | |
|---|---|---|---|
| 685649 | 7/1930 | France | 285/205 |
| 1201761 | 1/1960 | France | 285/158 |
| 2001535 | 9/1969 | France | 285/158 |

*Primary Examiner*—Dave W. Arola
*Attorney, Agent, or Firm*—James C. Fails; Wm. T. Wofford; Arthur F. Zobal

[57] ABSTRACT

Apparatus and method for interconnecting a rubber, fluid-impermeable cup having a wall thickness with a reservoir characterized by an attacher having interference fit with an aperture in the wall of the cup so as to form a fluid-impermeable seal, and a stem and flange over which a short section of rubber tubing is inserted sufficiently to exert a force against the flange the wall of the cup to effect a fluid-impermeable seal joint and a mechanical joint without adhesives. Preferably, the short section of rubber tubing is corrugated so as to allow being being without blocking flow of fluid therethrough and has corrugations extending beyond the attacher so as to not block the bore through the attacher.

6 Claims, 4 Drawing Figures

U.S. Patent   Jan. 12, 1988   4,718,703
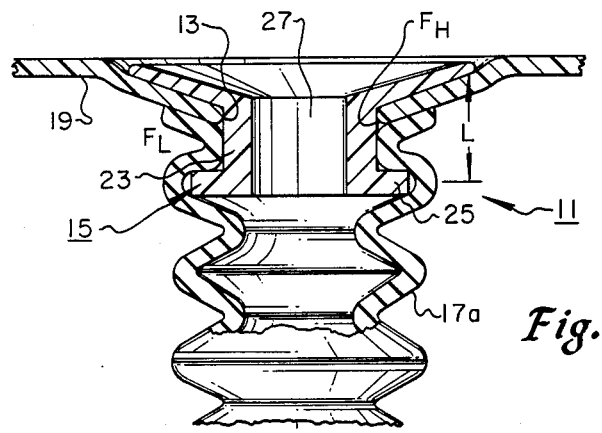
Fig. 1a
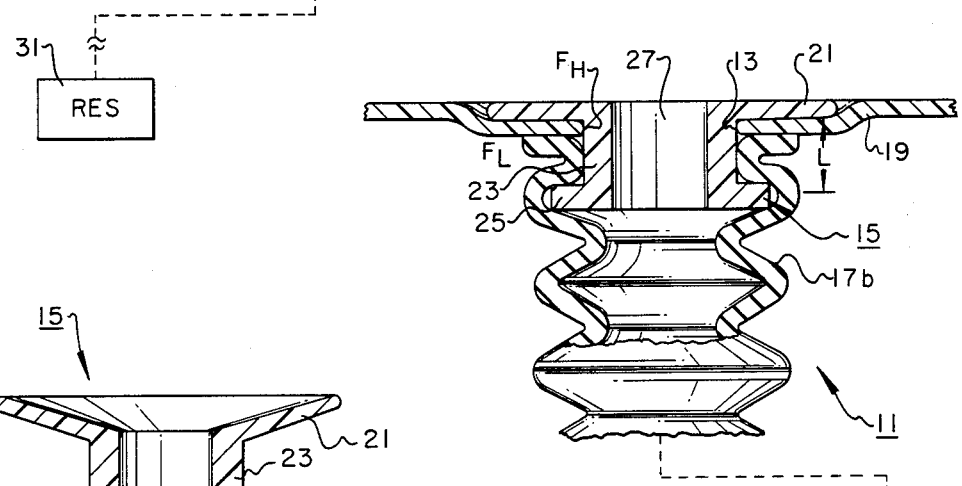
Fig. 1b
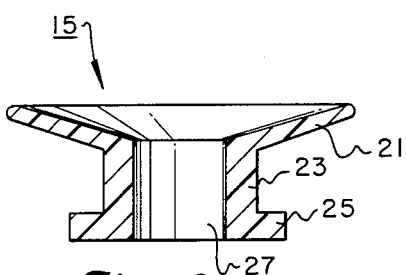
Fig. 2
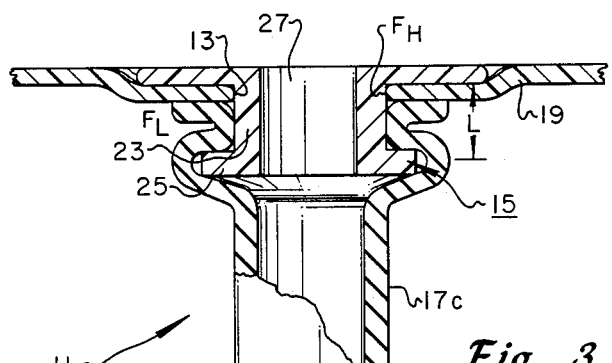
Fig. 3
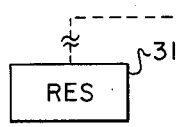

APPARATUS AND METHOD FOR INTERCONNECTING A RESERVOIR WITH A RUBBER CUP

FIELD OF THE INVENTION

This invention relates to method and apparatus for interconnecting a cup with a reservoir, as in an incontinence device.

DESCRIPTION OF THE PRIOR ART

The prior art has seen a wide variety of approaches to the method of joining a conduit such as a rubber drainage tube to the bottom of a container for interconnecting the container with a reservoir. The approaches of the prior art that have been employed to interconnect their elements use screw-down devices for sealingly interconnecting the tube and the wall of the container and have not been adaptable for the needs of an economical interconnection in incontinence devices and the like. Moreover, these incontinence devices are frequently discarded after a couple of weeks of use so economical approaches must be employed. Moreover, it is imperative that such devices do not cause the tube to block flow of fluid if the tube is bent, as by being sat upon. Also, the use of adhesives prolong the time of assembly and add to the cost so are undesirable. Particularly, prior art sealants and adhesives that required heat curing required a long period of time for assembly and added enormously to the cost of the product, so were undesirable.

Typical of the prior art approaches are those described in the following U.S. Pat. Nos. 3,490,791; 3,716,257; 4,018,459; 4,057,269; 4,191,409; 4,232,712; 4,352,358; 4,468,535; 4,524,999; 4,575,133. The devices of these patents employed mechanical clamping forces and the like to effect joinder and did not employ the approaches of the invention described and claimed later hereinafter. In particular, they did not provide economical method and apparatus such that the latter could be discarded after a short period of use, avoiding use of adhesives, curing or the like.

BRIEF DESCRIPTION OF THE DRAWINGS

FIG. 1a is a partially cut-away view, partly in section and partly schematic, illustrating one embodiment of this invention.

FIG. 1b is a second view, partly cut-away, partly cross-sectional and partly schematic, illustrating another embodiment of this invention.

FIG. 2 is a cross-sectional view of the attacher of FIG. 1a.

FIG. 3 is a partial view, partly cut-away, partly in section and partly schematic of another embodiment of this invention.

SUMMARY OF THE INVENTION

Accordingly, it is an object of this invention to provide apparatus and method facilitating interconnecting a rubber, fluid-impermeable cup with a reservoir without employing mechanical connections means, without employing adhesive or sealant.

More particularly, it is an object of this invention to provide a tube attacher and interconnection apparatus and method that is economical and can be discarded after a short period of use, that does not employ mechanical connectors, adhesives or long time in manufacture for curing or the like, and without employing elongate tubing that is easily stopped up.

These and other objects will become apparent from the descriptive matter hereinafter, particularly when taken in conjunction with the appended drawings.

In accordance with this invention there is provided apparatus and method for interconnecting a rubber, fluid-impermeable cup having a relatively flat bottom and a wall thickness, with a reservoir, and characterized by an attacher having an interference fit with an aperture in the wall of the cup so as to form a fluid-impermeable seal and having a stem and flange over which a short section of rubber tubing is inserted sufficiently to exert a force against the flange and against the wall of the cup to effect a fluid-impermeable seal joint and a mechanical joint without adhesives. Preferably, the short section of rubber tubing is corrugated so as to allow being bent without blocking flow of fluid therethrough and has corrugations extending beyond the attacher so as to not block the bore through the attacher.

Specifically, this application joins a rubber drainage tube at the bottom of a rubber container that has a relatively flat bottom for draining of fluids such as urine from the container such as the cup having substantially atmospheric pressure and draining the fluid to a reservoir. The joint between the tube and the cup is liquid tight and substantially mechanically secure, yet is accomplished without the use of adhesives or sealants.

DESCRIPTION OF PREFERRED EMBODIMENTS

Referring to FIGS. 1a, b and 3, the means 11 for interconnecting a rubber fluid-impermeable cup having a wall thickness with a reservoir comprises an aperture 13, an attacher 15, a short section of rubber tubing 17a, 17b and 17c.

The aperture 13 has first radial dimensions and penetrates laterally through the cup wall 19, or wall of the cup, at a predetermined location. As will be appreciated, the aperture is defined by cutting through the wall so that the thickness of the wall provides an aperture wall extending peripherally around the aperture.

The attacher 15 has a base 21, a stem 23, and a flange 25. Penetrating through all three of the base, stem and flange is a bore 27. The stem is connected at one end with the base 21 and at the other end with the flange 25. The outer wall of the stem 23 has lateral dimensions slightly greater than the radially dimensions of the aperture such that an interference fit is provided to seal against leakage of fluid such as liquid. Expressed otherwise, the wall 19 exerts a force in a horizontal direction, given the designation $F_H$ against the outer wall of the stem to provide a fluid-impermeable seal. The stem also has a length L between the flange and the base such that the short section of tubing will exert a force $F_L$ as described more nearly completely hereinafter.

The short section of rubber tubing 17(a, b and c) is adapted for connection with the reservoir at a first end. This interconnection with the reservoir is not particularly critical and is shown only schematically in FIGS. 1a and 1b and 3 since any of the conventional approaches may be employed for this interconnection. Its second end is adapted for connection to the cup, specifically to the wall 19 of the cup. That interconnection is illustrated in greater detail since it is the heart of this invention. The tubing has elasticity and is adapted for being forced over the flange 25 and, having a radially elastic memory, retains an attained position when forced over the flange. In addition, the tubing has a longitudinal elastic memory and is adapted to be forced over the flange sufficiently to effect a longitudinal force $F_L$ to effect a longitudinal force against the wall of the cup, as illustrated in the Figs., against the flange, thereby effecting a fluid-impermeable seal joint and a mechanical seal joint without the use of adhesives. The illustrated second ends of the tubing sections 17 (a, b, and c) have respectively at least one corrugation into which will fit the flange 15 and allow the force $F_L$ to be exerted between the flange 25 and the base 21 for capturing the end of the tube against the wall 19 of the cup.

In the illustrated embodiments, the attacher 15 is preferably formed of a hard plastic, like ABS (acrylonitrile butadiene styrene copolymer), a hard rubber or the like, although other materials can be employed if they have sufficient strength to sustain the forces exerted. The wall 19 is preferably of rubber since the cup is usually formed of rubber, e.g. 35 durometer hardness. The short tubing 17 is preferably of rubber, or similar composition. For example, a composition comprising forty percent (40%) by weight EVA (ethylene vinyl acetate) and sixty percent (60%) by weight silicone rubber can be employed to make the tubing.

Another way of explaining the invention is as follows: The wall 19 of the cup, with an aperture 13 formed therewithin sealingly engages the outer wall of the stem 23 of the attacher 15. This is because there is interference fit between the wall of the aperture and the outer wall of the stem 23. For example, the flange may be inserted through the aperture from the interior of the cup if desired, during assembly. A section of the tube 17 is stretched over the flange 25, or smaller end of the attacher, the base being somewhat larger and placed interiorly of the cup. The tube is continued to be forced inwardly until the end of the tube contacts the wall of the container and a force $F_L$ is created between the flange 25 and the base 21 so as to capture the wall 19 of the cup adjacent the end of the tubing 17. The elastic memory of both the wall of the container and the wall of the tube will thus cause the force $F_L$ to retain a secure mechanical connection. In addition, it creates a fluid-impermeable connection which, coupled with the constrictive force of the interference fit between the aperture 13 and the wall 19, effects the liquid seal and a mechanical connection, all without the requirement of using a screw-down mechanical connection or adhesives.

It is noteworthy that in the present application, the attacher 15, as illustrated by itself in FIG. 2, is a rigid part that had to be small, non-corrosive in a mildly alkaline environment and have a short longitudinal dimension, since rigid, longer units would cause discomfort to a wearer where an incontinence device or the like was worn by a patient.

In addition, this is a disposable unit and is projected to be used in a large quantity with low cost. Consequently, it had to be made economical and the time in being made must be kept to a minimum. Thus, many of the usual alternative solutions such as use of adhesives or mechanical nuts with threads and the like could not be employed herein. In particular, use of catalyzed adhesives or the like which required curing times were forbidden, to be practical. In addition, in an incontinence device, the unit must maintain a fluid-permeable passageway regardless of how the patient or wearer, sits. Toward this end, the corrugated tubes as illustrated in FIGS. 1a and 1b are preferable since they resist blocking flow of a fluid such as urine when employed in this invention. Thus, it can be seen in the illustrated embodiments that at least the corrugation near the second end of the tubing 17 facilitates the attachment with the wall 19 of the cup.

The reservoir 31 may comprise any of the usual reservoirs that will hold the fluid involved. For example, with an incontinence device, the reservoir may be a bag or the like worn on the leg of the wearer with the usual type tubular connection therewith for draining fluid thereinto.

Thus it can be seen that the method of the invention provides, in method aspects, the following steps of effecting an aperture laterally through the wall of the cup at a desired location, inserting through the aperture an attacher having an enlarged base at one end and an enlarged but somewhat smaller flange at the other end with a bore penetrating through the base, stem and flange and with the stem having an outer radial dimension somewhat larger than the dimensions of the aperture so as to effect an interference fit and a liquid-impermeable seal at the juncture of the wall of the aperture and stem; and forcing over the flange of the attacher a short section of rubber tubing that is adapted for connection with the reservoir at a first end and with the wall of the cup at a second end, the rubber tubing having sufficient elastic memory to be forced longitudinally of the stem to create forces to exert radial and longitudinal forces sufficient to effect a fluid-impermeable seal joint and mechanical seal joint with the wall of the cup without the use of adhesives when the rubber tubing is inserted over the flange and longitudinally along the stem of the attacher sufficiently to effect longitudinal force against the flange and against the cup wall.

Although this invention has been described with a particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. Means for interconnecting a rubber, fluid-impermeable cup having a wall thickness with a reservoir comprising:
   a. an aperture of first radial dimensions penetrating laterally through said cup at a predetermined location and having a wall extending peripherally therearound;
   b. an attacher having a base, a stem, and a flange; said attacher terminating at said base and at said flange and said base having a bore penetrating therethrough and connected to said stem at a first end thereof; said stem having a bore penetrating therethrough and connected at its other end to said flange; said flange having said bore penetrating therethrough and extending laterally outwardly to a larger diameter than said stem; said stem having a second radial dimension slightly greater than said first radial dimension of said aperture so as to effect an interference fluid-impermeable seal with said wall of said aperture when inserted therethrough and having a first longitudinal length L greater than the thickness of the wall of the cup so as to provide a longitudinal space between the wall of the cup and said flange when installed through said aperture; and c. a short section of rubber tubing adapted for connection with said reservoir at a first end and having its second end adapted for connection to said cup; said tubing having elasticity and adapted for being forced over said flange of said attacher, having a radial elastic memory for remaining in an attained position when forced over said flange and having a longitudinal elastic memory and adapted to be forced over said flange sufficiently to effect a longitudinal force against the wall of the cup and said flange, thereby effecting a fluid-impermeable seal joint and a mechanical seal joint without use of adhesives.

2. The means of claim 1 wherein said short section of rubber tubing is corrugated adjacent at least its said second end to facilitate connecting to said attacher.

3. Means of claim 2 wherein said short section of rubber tubing is corrugated over most of its length and is adapted to be bent without blocking flow of fluid therethrough.

4. A method of interconnecting a rubber, fluid-impermeable cup having a wall thickness with a reservoir comprising the steps of:

a. effecting an aperture laterally through the cup at a desired predetermined location;

b. inserting through said aperture an attacher terminating at an enlarged base at one end and an enlarged flange at another end with a stem therebetween and having a bore penetrating through the base, stem and flange with the stem having larger external radial dimensions than the radial dimensions of said aperture so as to effect an interference fit and a liquid-impermeable seal with the wall of the aperture when inserted therethrough and having a first longitudinal length L greater than the thickness of the wall of the cup so as to provide a longitudinal space between the wall of the cup and said flange when installed through said aperture; and c. forcing over said flange of said attacher a short section of a rubber tubing that is adapted for connection at its first end with the reservoir and having its second end adapted to be forced over said flange and to remain in place and exert a radial and longitudinal force sufficient to effect a fluid impermeable seal joint and a mechanical seal joint, without use of adhesives when inserted over the flange and downwardly along said stem sufficiently to effect a longitudinal force against the flange and against the cup wall.

5. The method of claim 4 wherein said short section of rubber tubing is corrugated adjacent at least its second end to facilitate connecting to the attacher and yet allow being bent without blocking the flow of fluid therethrough and wherein said tubing is pushed over said flange sufficiently that said flange engages a corrugation in said tubing for holding said tubing with the forced being exerted longitudinally against the wall of the cup and the flange.

6. The method of claim 5 wherein said short section of rubber tubing is corrugated over most of its length and particularly past said attacher such that it can be bent without blocking the flow of fluid therethrough.

* * * * *